(12) United States Patent
Varin et al.

(10) Patent No.: US 8,152,666 B2
(45) Date of Patent: Apr. 10, 2012

(54) RIBBED POWER-TRANSMISSION BELT

(75) Inventors: Hervé Varin, Joue-les-Tours (FR); Willy Bourdeau, Villebarou (FR)

(73) Assignee: Hutchinson (FR)

( * ) Notice: Subject to any disclaimer, the term of this patent is extended or adjusted under 35 U.S.C. 154(b) by 2151 days.

(21) Appl. No.: 10/706,696

(22) Filed: Nov. 12, 2003

(65) Prior Publication Data

US 2005/0090350 A1    Apr. 28, 2005

(30) Foreign Application Priority Data

Oct. 24, 2003   (FR) ..................................... 03 12456

(51) Int. Cl.
*F16G 5/20*      (2006.01)
*F16G 1/28*      (2006.01)

(52) U.S. Cl. ......... 474/238; 474/237; 474/252; 156/138

(58) Field of Classification Search .......... 474/237–238, 474/260–265, 205, 250–252, 152–153; 156/137–139
See application file for complete search history.

(56) References Cited

U.S. PATENT DOCUMENTS

| | | | |
|---|---|---|---|
| 3,643,518 A * | 2/1972 | Semin et al. ................. | 474/238 |
| 4,011,766 A * | 3/1977 | Waugh .......................... | 474/238 |
| 4,330,287 A * | 5/1982 | Fischer ......................... | 474/238 |
| 4,647,278 A | 3/1987 | Hull | |
| 4,904,232 A | 2/1990 | Kitahama et al. | |
| 4,931,118 A | 6/1990 | Kitahama et al. | |
| 4,960,476 A * | 10/1990 | White et al. .................. | 156/138 |
| 5,026,327 A | 6/1991 | White, Jr. et al. | |
| 5,112,282 A * | 5/1992 | Patterson ...................... | 474/260 |
| 5,458,710 A * | 10/1995 | White et al. .................. | 156/138 |
| 6,176,799 B1 | 1/2001 | Kinoshita et al. | |
| 2003/0180516 A1 | 9/2003 | Hasaka et al. | |

FOREIGN PATENT DOCUMENTS

| EP | 0 633 408 A2 | 1/1995 |
|---|---|---|
| JP | 03129147 | 6/1991 |
| JP | 2003-14053 A * | 1/2003 |
| WO | WO 03/062666 A1 | 7/2003 |

* cited by examiner

*Primary Examiner* — Marcus Charles

(74) *Attorney, Agent, or Firm* — Alston & Bird LLP

(57) ABSTRACT

A power transmission belt, in particular for a motor vehicle and presenting at least V-ribs having flat side faces and rounded ridges, wherein the ridges present a convex curvilinear profile having a mean radius of curvature greater than 1 mm and less than or equal to 1.5 mm.

17 Claims, 4 Drawing Sheets

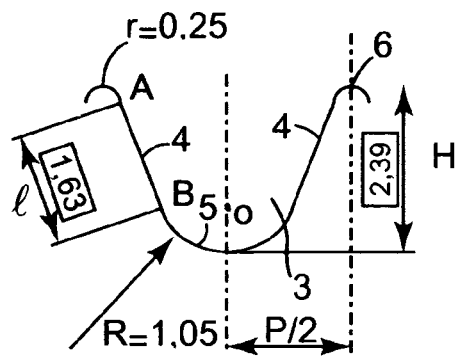
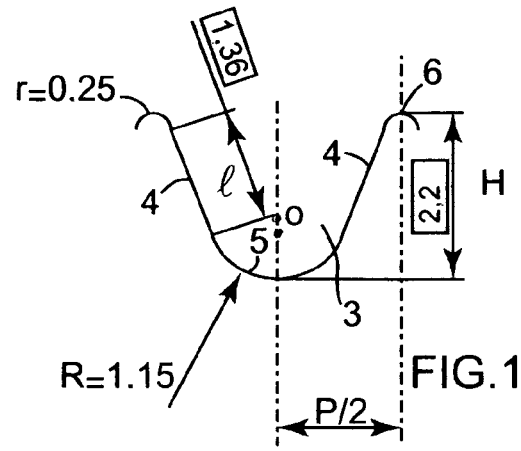
FIG.1a  FIG.1b
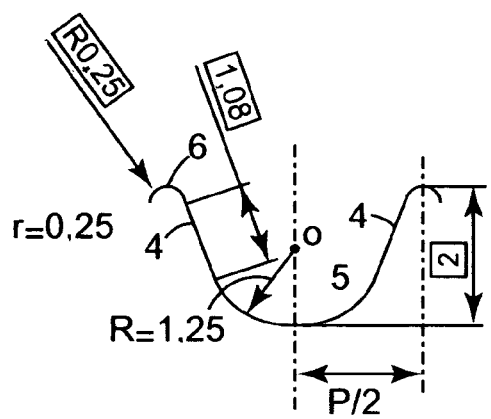
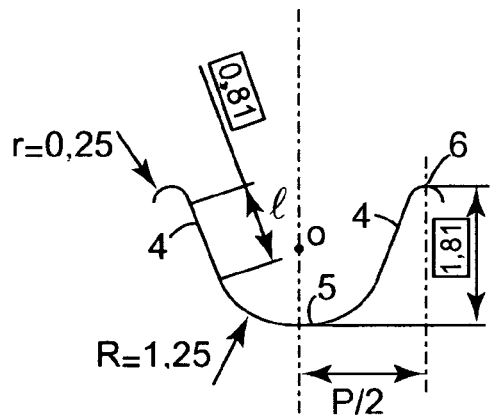
FIG.1c  FIG.1d
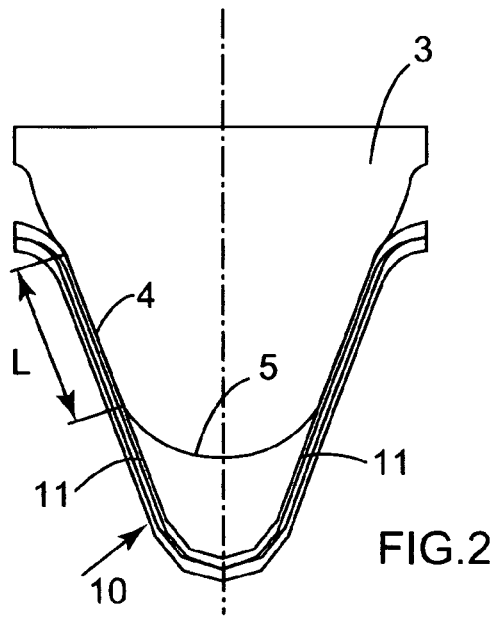
FIG.2

RIBBED POWER-TRANSMISSION BELT

FIELD OF INVENTION

The present invention relates to a ribbed power-transmission belt presenting V-ribs, i.e. a belt of the kind known as a "Poly-V" belt, and it relates more particularly to a belt whose ribs present straight side faces with a ridge that is rounded in shape, and in particular circular.

BACKGROUND OF THE INVENTION

One such belt is proposed in U.S. Pat. No. 4,047,446. In that patent, the ridges of the ribs are rounded so as to ensure gaps 52 and 53 of equal size firstly between the ridges 43 of projections 44 on the sheave and the bottoms 45 of the grooves 40 in the belt, and secondly between the ridges 50 of the ribs 35 on the belt and the bottoms 51 of the spaces between the projections 44 of the sheave, in order to avoid harmful contact between the belt and the sheave as the belt wears. That belt presents teeth of considerable height and it is very sensitive to bending/compression stresses.

In order to avoid the cracking that appears in the teeth of power transmission belts because of the stresses due to flexing back and forth, U.S. Pat. No. 4,904,232 proposes implementing teeth having ridges that present a circular profile, each ridge being made of an elastomer having hardness on the Shore A scale that is less than that of the remainder of the tooth.

Such a configuration suffers from the drawback of making belt considerably more complicated.

U.S. Pat. No. 5,803,855 proposes improving contact between the belt and the sheave by providing clearance spaces between adjacent ribs and by using non-linear contact surfaces so as to reduce stress concentrations at the ridges of the belt, and thereby reduce rib cracking. In that belt, the ridges may be circularly arcuate in shape and they connect with side faces that are not plane.

That type of belt is not easy to implement, in particular because of the non-plane profiles of the contacting surfaces which must be designed in such a manner as to ensure good power transmission and of the presence of clearance spaces between the ribs.

The present invention seeks to provide a belt that enables the cracking phenomena that appear at the ridges of the teeth to be avoided at least to a large extent, e.g. in motor vehicles (cars, motor bikes, . . . ).

Surprisingly, the Applicant company has found that the appearance of cracking in teeth ridges is liable to occur not only when the belt is subjected to flexing cycles.

Thus, the Applicant has found that there exists another phenomenon which has previously not been identified, constituted by the swelling of the free contact zone at the ridge of a tooth, which swelling is due to the tension in the belt and to the winding diameter, and it leads to deformation at the contact edges in particular, which can lead to the appearance of cracking. This phenomenon tends to predominate at small winding diameters (e.g. less than 60 millimeters (mm) as are to be found on alternator sheaves). Such small diameters are often present in the belt drive systems of cars.

U.S. Pat. No. 4,944,717 proposes mitigating the problem of flexing in flat-sided V belts by providing teeth with ridges that are concave in shape. However, such a profile is unfavorable from the point of view of swelling deformation since it induces a maximum additional amount of deformation at the ridges of the teeth.

Furthermore, suggestions have been made to trim the flat ridges of teeth as obtained by molding so as to rectify them by machining flat ridges that are connected to the side faces directly, or via small radii of curvature (0.6 mm or less). That makes it possible to eliminate the flat surface layer that comes from molding, which layer is the most fragile, but only at the cost of an additional rectification step. That profile is of reduced height and that makes it sensitive to the swelling deformation that is induced by establishing tension, since such deformation also depends on the winding diameter, thus giving rise to cracking appearing due to the swelling defect that had not been identified beforehand.

In other words, prior art solutions have led to an improvement in belt behavior faced with flexing phenomena, but that has generally been accompanied by deterioration in behavior faced with swelling deformation.

The object of the invention is to provide a belt that improves behavior relative to swelling that generates cracking at the ridges of the ribs.

SUMMARY OF THE INVENTION

For this purpose, the invention provides a power transmission belt, in particular for a motor vehicle and presenting at least V-ribs having flat side faces and rounded ridges, wherein said ridges present a convex curvilinear profile having a mean radius of curvature greater than 1 mm and less than or equal to 1.5 mm.

The curvilinear profile for the ridges of the teeth, which are preferably obtained by molding, but which also could be obtained by machining, makes it possible, within the specified range of radii of curvature, to avoid harmful concentrations of deformation and to significantly improve behavior relative to concentrations of swelling deformation compared with a flat ridge obtained by molding.

Said radius of curvature, e.g. the radius of a circle constituting said ridges of the ribs is greater than 1 mm and less than or equal to 1.5 mm. It may lie in the range 1.05 mm to 1.45 mm, and in particular in the range 1.1 mm to 1.3 mm, and more particularly in the range 1.15 mm to 1.25 mm.

The length l of the plane side faces measured between their connections with the bottoms of the ribs and said ridges advantageously lies in the range 0.7 mm to 1.8 mm, and in particular in the range 0.8 mm to 1.7 m, and more particularly lies in the range 1 mm to 1.5 mm, and preferably in the range 1.08 mm to 1.36 mm.

The height H of the ribs is advantageously in the range 1.8 mm to 2.4 mm, and in particular in the range 1.9 mm to 2.3 mm, and more particularly in the range 2 mm to 2.2 mm.

Preferably, the curvilinear profile is tangential to the side faces at its points where it connects with said side faces.

The V-ribs may be obtained by molding. Alternatively, at least the ridges of the V-ribs are machined.

BRIEF DESCRIPTION OF THE DRAWINGS

Other characteristics and advantages of the invention appear better on reading the following description given with reference to the accompanying drawings, in which:

FIGS. 1a to 1d are sections through four embodiments of rib profiles for a K type belt of the invention;

FIG. 2 shows a belt of the invention mounted on a sheave;

MORE DETAILED DESCRIPTION

Figure 3:
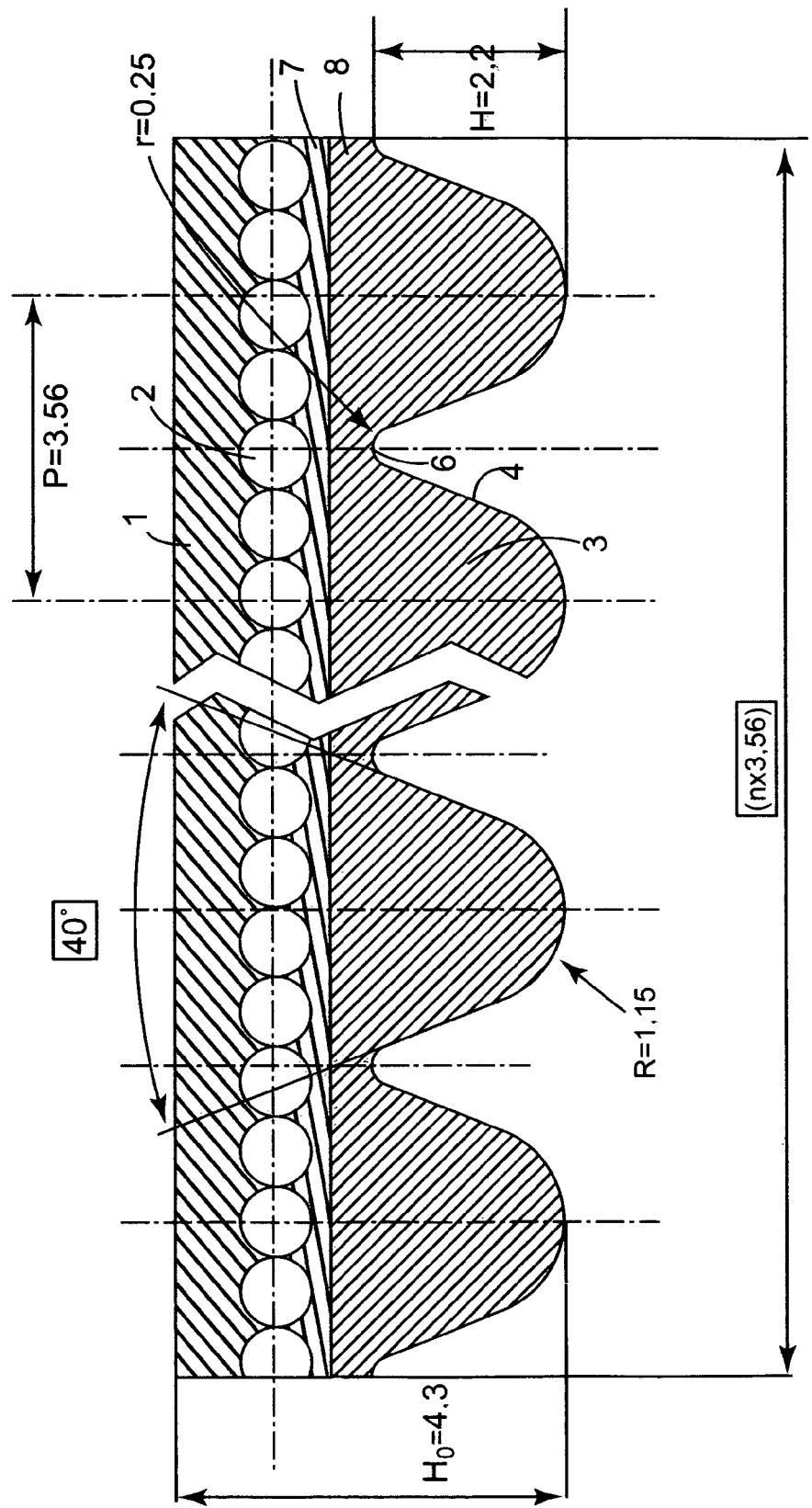
FIG. 3 shows a belt in a preferred embodiment of the invention.

In the drawings, the numerical values, i.e. r, R, l, P, $H_0$ and H are given in millimeters.

Present-day V-rib belt profiles comply with pulley standards such as ISO 9981 which specify in particular the angle (40°), and the pitch (3.56 mm), e.g. for a K profile, together with well-defined radii for the bottoms of the ribs or teeth and the ridges of the ribs.

In spite of these constraints on pulleys, belt manufacturers are free to design a belt profile in order to obtain power transmission by adhesion with the best possible lifetime.

Transmitting power requires an ability on the part of the belt to drive one or more accessories without excessive slip throughout the lifetime of the belt, and to do so without failure. This operating constraint is associated in part with the contacting surfaces bearing against the grooves in the sheave under the effect of the tension needed to avoid slip.

The end of the lifetime of a belt is marked in particular by the appearance of cracking on the teeth at the ridges thereof, caused by back and forth flexing of the teeth imparted by passing in alternation over sheaves and/or over parts that are not striped. The teeth are worked alternatively in traction and in compression whenever the transmission system includes a deflector pulley, for example, which comes into contact with the back of the belt. It is this alternating fatigue that leads to cracking.

In addition, and as identified by the Applicant company, this appearance of cracking is also caused by the free contact zone at the ridges of the teeth swelling, thereby generating deformation specifically in the vicinity of the connections with the contacting surfaces, which can likewise lead to cracking.

Various shapes of profile have been proposed in order specifically to reduce the effects induced by flexing. Profiles of reduced height have provided an improvement essentially on flexing stresses. All such profiles present free zones constituted by the ridges of the teeth that are flat and that are connected to contact zones (flat side faces) where the belt makes contact with the profile of the sheave, this connection between zones taking place optionally via rounded portions.

With those conventional prior art truncated shapes, tensioning and winding give rise to significant swelling deformation of the free zones. The resulting deformation leads to the appearance of cracking at the ridges of the teeth. This swelling deformation is greater than the deformation due to flexing. As a result, those profiles do not provide a genuine solution to the problem of lifetime, but serve only to reduce the effect induced by deformation due to flexing.

In the invention, the completely rounded shape connecting the flat side faces enables swelling to be obtained that is uniform under the effect of tension. In addition, the swelling deformation which in conventional profiles is at a maximum in the vicinity of the connection between the ridges of the teeth and the flat side faces is decreased by this curved shape.

For defined tooth height, the loss of geometrical contact in the free state is compensated by the rounded portion deforming under the effect of belt tension and winding. To a first approximation, the contact area remains equivalent. This makes it possible to provide a level of transmission that is equivalent to that of known belts.

FIGS. 1a to 1d are sections of four rib profiles 3 for a K-type molded belt of the invention, for a pitch P of 3.56 mm and an angle α equal to 40°.

These ribs are characterized by their heights H measured between the bottoms of the teeth and the ridges of the teeth. The bottom of a rib of tooth 6 is rounded with a radius r of 0.25 mm. It interconnects flat side faces 4 each of which, in cross-section of the belt, gives a straight line segment AB of length l which extends between its connection at point A to the bottom of a tooth 6 and its connection at point B to the convex tooth ridge 5. In FIGS. 1a to 1d, the ridges 5 of the teeth are shown in section as being circular arcs of radius R and on centers O situated on the axes of the ridges 5.

Figure 4:
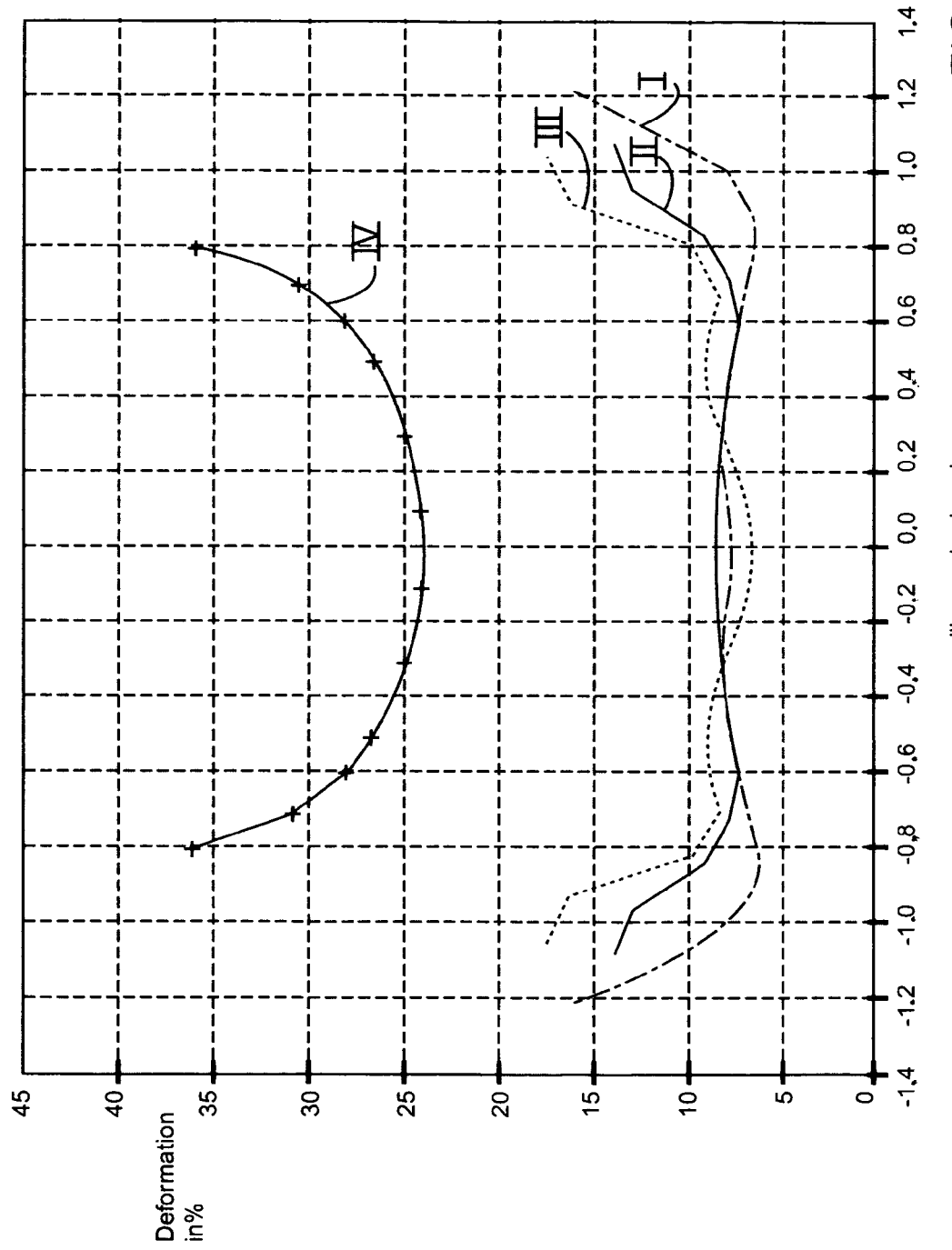
FIG. 4 is a graph comparing surface (skin) swelling deformation on the teeth in the free zone for a 45 mm diameter sheave at a tension of 120 Newtons per tooth per strand (N/tooth/strand) for three belts of the invention, one as shown in FIG. 1d (curve I), one as shown in FIGS. 1b and 3 (curve II), one as shown in FIG. 1a (curve III) and a said prior art belt with trimmed flat ridges (curve IV)
Figure 5:
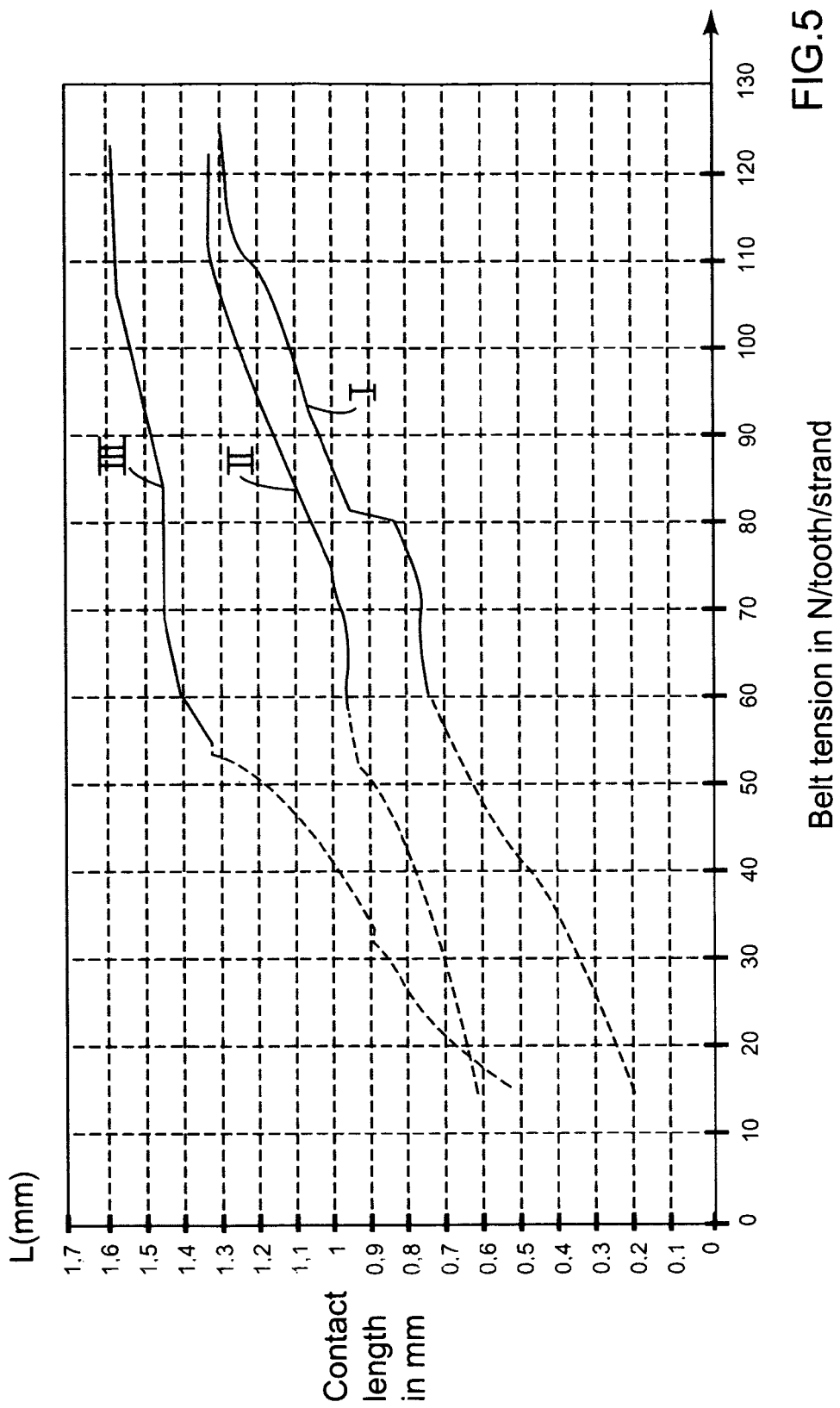
FIG. 5 plots the length L (in mm) of tooth flanks in contact with the sheave as a function of belt tension in N/tooth/strand for the above-mentioned belts (curves I to III respectively).

In FIG. 1a, R=1.05 mm, l=1.63 mm, and H=2.39 mm (curve III in FIGS. 4 and 5).

In FIG. 1b, R=1.15 mm, l=1.36 mm, and H=2.22 mm (curve II in FIGS. 4 and 5).

In FIG. 1c, R=1.25 mm, l=1.08 mm, and H=2 mm.

In FIG. 1d, R=1.35 mm, l=0.81 mm, and H=1.81 mm (curve I in FIGS. 4 and 5).

The two preferred profiles are those of FIGS. 1b and 1c since they combine high levels of performance in terms of swelling deformation and of flexing deformation with a height of tooth that provides a high level of power transmission.

By way of example, other rib profiles could be implemented, and in particular with the following values:
R=1.1 mm, l=1.5 mm, and H=2.3 mm;
R=1.2 mm, l=1.22 mm, and H=2.1 mm;
R=1.3 mm, l=0.95 mm, and H=1.9 mm.

In FIG. 4, it can be seen that for curves I and III corresponding to height H of 1.81 mm and 2.39 mm, the maximum deformation (in the range 16% to 17%) is greater than for a height H of 2.2 mm. For a height H greater than 2.4 mm, compression deformation is greater. It is much higher for the above-mentioned prior art belts with machined flat ridges (curve IV).

Nevertheless, all of the above-described profiles present performance that is satisfactory from the point of view of stresses due to swelling and to flexing.

In practice, for a K-type belt, the pitch P may lie in the range 3.5 mm to 3.62 mm, the angle α between the flat flanks 4 may lie in the range 36° to 44°, and the radius r may be less than 0.25 mm (with a minimum value of 0.1 mm).

Although the profiles described are circular, they could be approximated by profiles that are parabolic, elliptical, etc. . . . having the same mean radius of curvature.

Reducing the height of the teeth is favorable from the point of view of flexing stresses, and it is accompanied by an increase in the radius R and in the width of the convex region 5 at the ridges of the teeth, which is favorable from the point of view of swelling deformation. FIG. 2 shows the position occupied by the belt for a given level of tension (e.g. 120 N/tooth/strand).

FIG. 5 shows the contact length L as a function of tension T (in N/tooth/strand) for the three above-specified belts. The belt of height 1.8 mm (curve I) presents a contact length L that is sufficient for power transmission. The belt of height 2.2 mm (curve II) constitutes a good compromise between level of deformation (FIG. 4) and contact length L. The belt of height 2.4 mm presents a greater length L, but this is to the detriment of the level of swelling deformation as compared with curve II.

It can be seen that there exists a contact length L>l for which the tension of the belt pressing a portion of the ridge 5 into the groove 11 of the sheave 10 gives rise to a phenomenon of compensation. Nevertheless, the height H cannot be reduced too far since l also decreases, and the length L then tends to become too short.

FIG. 3 is a section through a K-type belt (pitch P of 3.56 mm) corresponding to the embodiment of FIG. 1b. In conventional manner it comprises a belt body 1 of elastomeric material, e.g. polychloroprene rubber, ethylene-propylene diene monomer (EPDM), hydrogenated nitrile butadiene rubber, etc. . . . , a second layer 7 having touching turns wound in a spiral thereon constituting reinforcing cords, e.g. made of polyester or polyamide 4.6, 6, or 6.6, and finally a layer 8 of elastomeric material, for example polychloroprene rubber, EPDM, hydrogenated nitrile butadiene rubber, and including n ribs 3. The total height $H_0$ of the belt is 4.3 mm in this example, and the height H of the teeth is 2.2 mm.

The ribs can be measured without cutting the belt by using a standard appliance referred to as a "Contourograph", or else from a clean section of a slice of belt on a videometer, or a profile projector.

What is claimed is:

1. A power transmission belt for a motor vehicle and presenting V-ribs made of a single elastomer material and having flat side faces and rounded ridges, wherein said ridges present a convex curvilinear profile having a mean radius of curvature greater than 1 mm and less than or equal to 1.5 mm.

2. A belt according to claim 1, wherein said range of curvature lies in the range 1.05 mm to 1.45 mm.

3. A belt according to claim 2, wherein said range of curvature lies in the range 1.1 mm to 1.3 mm.

4. A belt according to claim 2, wherein said range of curvature lies in the range 1.15 mm to 1.25 mm.

5. A belt according to claim 1, wherein said curvilinear profile is a circle of radius equal to said radius of curvature.

6. A belt according to claim 1, wherein the length l of the flat side faces measured between their connections with the bottoms of the teeth and with said ridges lies in the range 0.7 mm to 1.8 mm.

7. A belt according to claim 6, wherein the length l lies in the range 0.8 mm to 1.7 mm.

8. A belt according to claim 7, wherein the length l lies substantially in the range 1 mm to 1.5 mm.

9. A belt according to claim 7, wherein the length l lies substantially in the range 1.08 mm to 1.36 mm.

10. A belt according to claim 1, wherein the height H of the ribs lies in the range 1.8 mm to 2.4 mm.

11. A belt according to claim 10, wherein the height H of the ribs lies in the range 1.9 mm to 2.3 mm.

12. A belt according to claim 10, wherein the height H of the ribs lies in the range 2 mm to 2.2 mm.

13. A belt according to claim 1, wherein the radius of curvature is substantially equal to 1.15 mm, wherein the rib height H is substantially equal to 2.2 mm, and wherein the length l of the flat side faces is substantially equal to 1.35 mm.

14. A belt according to claim 1, wherein the curvilinear profile is tangential to the side faces at its points of connection with said side faces.

15. A belt according to claim 1, the belt being of the K type.

16. A belt according to claim 1, wherein the V-ribs are obtained by molding.

17. A belt according to claim 1, wherein at least the ridges of the V-ribs are machined.

* * * * *